US012238066B2

(12) United States Patent
Bansal et al.

(10) Patent No.: US 12,238,066 B2
(45) Date of Patent: Feb. 25, 2025

(54) EDGE GATEWAYS IN DISAGGREGATED NETWORKS

(71) Applicant: MICROSOFT TECHNOLOGY LICENSING, LLC, Redmond, WA (US)

(72) Inventors: Deepak Bansal, Bellevue, WA (US); Gerald Roy Degrace, Atlanta, GA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 349 days.

(21) Appl. No.: 17/675,999

(22) Filed: Feb. 18, 2022

(65) Prior Publication Data
US 2023/0269227 A1     Aug. 24, 2023

(51) Int. Cl.
*H04L 9/40* (2022.01)
*H04L 12/46* (2006.01)

(52) U.S. Cl.
CPC ...... *H04L 63/0245* (2013.01); *H04L 12/4641* (2013.01); *H04L 63/0263* (2013.01); *H04L 63/0272* (2013.01); *H04L 63/08* (2013.01); *H04L 63/1458* (2013.01); *H04L 2463/142* (2013.01)

(58) Field of Classification Search
CPC ............. H04L 63/0245; H04L 63/0263; H04L 63/0272; H04L 63/08; H04L 63/1458; H04L 12/4641; H04L 2463/142
See application file for complete search history.

(56) References Cited

U.S. PATENT DOCUMENTS

| | | | | |
|---|---|---|---|---|
| 10,097,372 | B2 * | 10/2018 | Bhattacharya | ........ H04L 41/342 |
| 10,997,106 | B1 * | 5/2021 | Bandaru | ............... G06F 13/385 |
| 11,916,883 | B1 * | 2/2024 | Wei | ......................... H04L 45/04 |
| 2020/0322287 | A1 | 10/2020 | Connor et al. | |
| 2021/0314301 | A1 | 10/2021 | Chanak et al. | |

(Continued)

FOREIGN PATENT DOCUMENTS

WO     2018071176 A1    4/2018

OTHER PUBLICATIONS

Linguaglossa, et al., "Survey of Performance Acceleration Techniques for Network Function Virtualization", In Proceedings of the IEEE, vol. 107, Issue 4, Apr. 2019, pp. 746-764.

(Continued)

*Primary Examiner* — Emmanuel L Moise
*Assistant Examiner* — Xiang Yu
(74) *Attorney, Agent, or Firm* — Han Gim; Newport IP, LLC

(57) ABSTRACT

Techniques are disclosed for processing data packets and implementing policies in a software defined network (SDN) of a virtual computing environment. A plurality of computing nodes are communicatively coupled to network devices. The computing nodes are configured to provide at least one cloud edge processing function. The network devices are configured to enable communications between virtual machines within a virtual network of the virtual computing environment in accordance with associated policies. The network devices and the processing function are disaggregated from dependencies on particular computing nodes that are hosting the virtual machines.

16 Claims, 12 Drawing Sheets

(56) References Cited

U.S. PATENT DOCUMENTS

| | | | |
|---|---|---|---|
| 2022/0114011 A1* | 4/2022 | Connor | G06F 9/5077 |
| 2022/0206908 A1* | 6/2022 | Brar | G06F 11/2005 |
| 2023/0229643 A1* | 7/2023 | Low | H04L 9/50 |
| | | | 707/692 |
| 2024/0283731 A1* | 8/2024 | Wang | G06F 3/0653 |

OTHER PUBLICATIONS

"International Search Report and Written Opinion Issued in PCT Application No. PCT/US22/052492", Mailed Date: Apr. 6, 2023, 12 Pages.

* cited by examiner

EDGE GATEWAYS IN DISAGGREGATED NETWORKS

BACKGROUND

A data center may house computer systems and various networking, storage, and other related components. Data centers may, for example, be used by service providers to provide computing services to businesses and individuals as a remote computing service or provide "software as a service" (e.g., cloud computing). Software defined networking (SDN) enables centralized configuration and management of physical and virtual network devices as well as dynamic and scalable implementation of network policies. The efficient processing of data traffic and efficiently utilizing the physical and virtual network devices are important for maintaining scalability and efficient operation in such networks.

It is with respect to these considerations and others that the disclosure made herein is presented.

SUMMARY

The present disclosure describes various techniques and systems for optimizing the operation of a cloud edge network to more efficiently utilize computing and networking resources and use less physical space and power by disaggregating cloud edge network functions. The cloud edge network functions can include those needed for connecting users to the desired cloud services. Some cloud edge scenarios may be processed either entirely in hardware where the complexity and variation are amenable to hardware implementations, or entirely in software to encompass high function/high variable environments. The present disclosure describes ways to efficiently cover the latter scenario in a way that can improve the operational efficiencies of the cloud service provider.

Many functions provided at the cloud edge network typically require Secure Sockets Layer (SSL), Transport Layer Security (TLS), or Internet Protocol Security (IPSec) termination from the end users. These functions may be followed by steering of the data connection to the appropriate cloud environment, application of layer-7 inspection and DDoS protections, followed by various functions that allow for the external world to securely access their VNET environment or any other cloud function via cloud policy.

While general software-based computing can be used to perform the above-described functions as well as other functions, there may not be sufficient space or power to continuously add computing resources such as racks of servers in order to accommodate increasing demands of the service provider. Additionally, the cost of servers can be high in contrast to some of functions being offloaded to dedicated custom hardware.

The disclosed embodiments provide a way to disaggregate cloud edge functions to selected processing agents (e.g., software-based functionality) to increase efficiency and reduce consumption of power and other resources. Disaggregation of cloud edge functions may refer to allocation of cloud edge functions so that they need not be performed and co-located within any particular general-purpose server. By using appliances or a dedicated hardware processing unit for TLS/SSL/IPSec termination and secure transport of traffic via cloud policy to the appropriate cloud environment, much of the compute intensive tasks can be offloaded from the compute servers. The offload of these functions to appliances or dedicated hardware can allow for steering of connections to the proper cloud resource to be performed with a reduced number of servers, thereby reducing the costs for operating a data center.

The described techniques can allow for virtual computing environments to support a variety of configurations while maintaining efficient use of computing resources such as processor cycles, memory, network bandwidth, and power. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
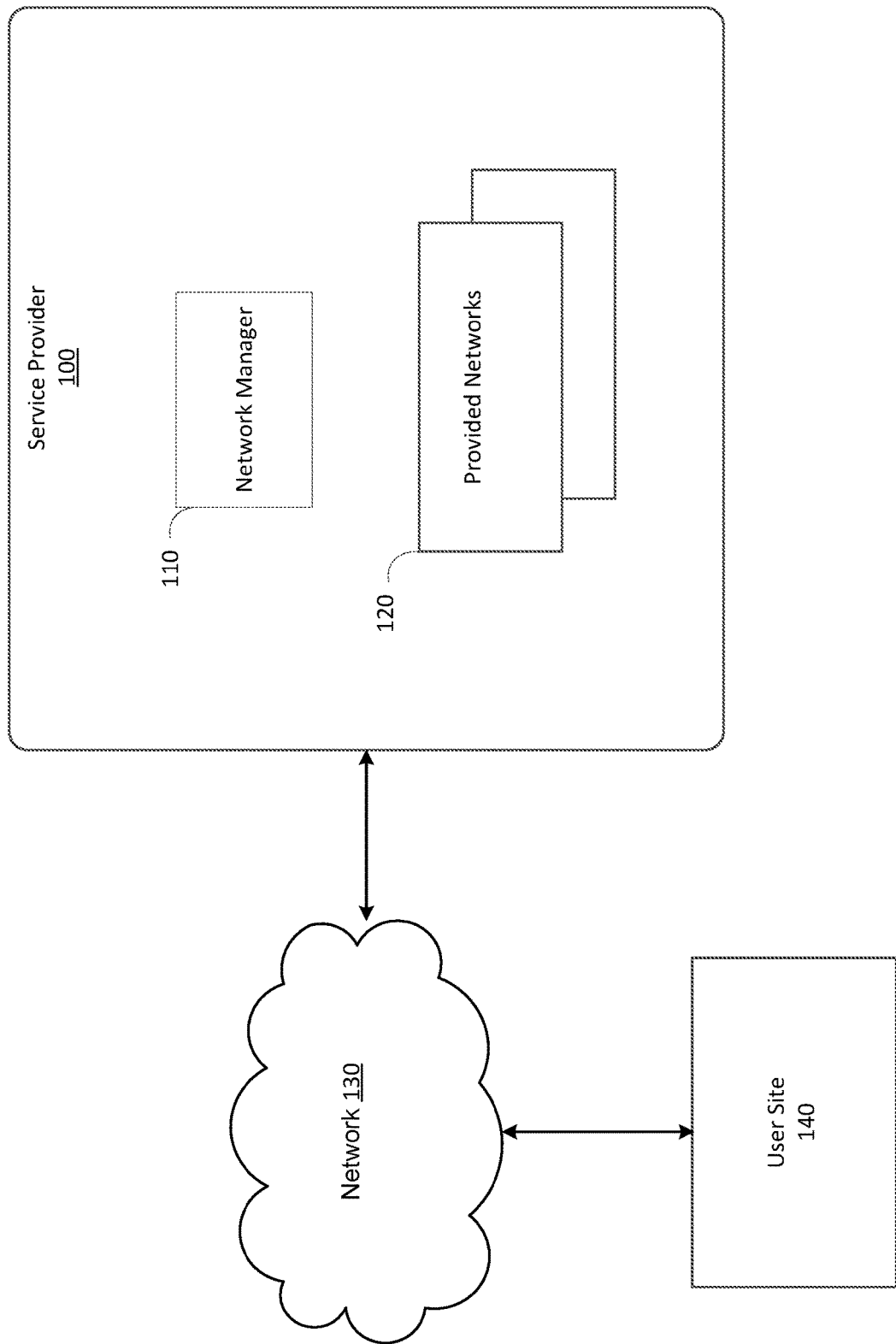
FIG. 1 is a diagram illustrating an example architecture in accordance with the present disclosure.

The disclosed embodiments enable datacenters to provide services in a manner that can enhance system flexibility and efficiency while reducing cost and complexity, allowing for more efficient use of computing, storage, and network resources. Efficient implementation of the end-to-end services by a cloud service provider can enable an experience that is seamless and more consistent across various footprints. The effective distribution of the described disaggregation and pooling techniques can also be determined based on the implications for various performance and security implications such as latency and data security.

The various embodiments disclosed herein provide a way to efficiently disaggregate and pool network and connectivity services to optimize the allocation of services to hardware or software based processing. Some embodiments may use a Smart Network Interface Card ("SmartNIC"), which may be a hardware-based acceleration device that may implement various ways of leveraging hardware acceleration and offloading techniques to perform a function, such as, for example, implementing tasks in hard ASIC logic, implementing tasks in soft (configurable) FPGA logic, implementing some tasks as software on FPGA software processor overlays, implementing some tasks as software on hard ASIC processors, or a combination thereof. In some embodiments, the hardware-based acceleration device may be a network communications device, such as a network interface card (NIC). The NIC may be configured to perform complex processing. Such a NIC may be referred to herein as a SmartNIC.

Cloud computing providers typically use a plurality of racks of servers to provide a gateway into the cloud environment. Such an environment that provides the gateway maybe referred to as a cloud edge or cloud edge function. A typical computing rack of a cloud service provider may have at least one top-of-rack (ToR) switch (two or more if redundancy is provided) and a number of servers. In some architectures, the servers may be provisioned with one or more SmartNICs. The SmartNICs may allow for each virtual machine (VM) to talk to any other VM through various types of virtual tunneling mechanisms. This can ensure that a virtual network can be instantiated where data communications are contained within the virtual network boundaries and no other customer's VMs or other external VMs can communicate with it in any way.

Typically, each server may have a number of VMs with at least one SmartNIC. The SmartNIC may provide a virtual interface to every VM on the server. Through policy, each VM can be programmed to communicate with any other VM within its virtual network with a series of complex policies. These VMs can be on the same machine or a different machine, and even in another datacenter. The policies can be complex and numerous and require a high level of processing and memory associated with their implementation.

Many functions provided at the cloud edge typically require Secure Sockets Layer (SSL), Transport Layer Security (TLS), or Internet Protocol Security (IPSec) termination from the end users. These functions may be followed by steering of the data connection to the appropriate cloud environment, application of layer-7 inspection and DDoS protections, followed by various functions that allow for external users to securely access their VNET environment or any other cloud function via cloud policy. There may be other functions that are applied, but to illustrate examples of the disclosed embodiments, the following functions are assumed:
1. TLS/SSL/IPSec termination with authentication
2. Steering the user connection to the desired cloud resource (with DDoS protections)
3. Securely transporting (using logical tunnels) of the user traffic via cloud policy to the appropriate cloud environment which may potentially require re-encryption of the traffic to that environment.

TLS/SSL/IPSec termination with authentication may require processing of cryptographic and authentication processes that may be more efficiently suited to dedicated custom hardware and processing. SmartNICs, for example, can process TLS or similar processing tasks with reduced space, power, and cost as compared to a general computing node.

For secure transport of traffic via cloud policy, dedicated custom hardware and processing can apply cloud policy (which can be extremely complex in nature) as well as the necessary cryptographic functions for the cloud environment. This type of functionality can be performed efficiently using SmartNICs, smart switches, and/or smart appliances.

Steering data and connections to the proper cloud resource (with DDoS protections) may be more suitable for general computing as the custom hardware needed to process Layer-7/DDoS and steering may not provide the flexibility needed to accommodate continuously changing cloud edge demands and certain advanced security functions.

While general software-based computing can perform the above described as well as other functions, there may not be sufficient space or power to continually add computing resources to the data center such as racks of servers in order to accommodate increasing demands. Additionally, the cost of servers can be high in contrast to some of functions being offloaded to dedicated custom hardware.

The disclosed embodiments provide a way to disaggregate cloud edge functions to selected processing agents (e.g., software-based processing functionality executing on a server) to increase efficiency and reduce consumption of power and other resources. Disaggregation of cloud edge functions may refer to allocation of the cloud edge functions so that they need not be performed and be co-located within any particular general purpose server or group of general purpose servers. By using appliances or a dedicated hardware processing unit for TLS/SSL/IPSec termination and secure transport of traffic via cloud policy to the appropriate cloud environment, much of the compute intensive tasks can be offloaded from the compute servers. The offload of these functions to appliances or dedicated hardware can allow for steering of connections to the proper cloud resource to be performed with a more optimal number of servers.

In one embodiment, a disaggregated cloud network may include network appliances that are configured to provide TLS/SSL/IPSec termination with authentication and secure transporting of traffic via cloud policy. In some embodiments, a single appliance can be programmed for both sets of functions. Alternatively, the functions can be distributed into multiple appliances. Implementation of the disclosed embodiments allows for the functions to be located at any location in the network. For example, the functions can be distributed to another location in the data center or other arbitrary location in accordance with priorities for efficiency and other objectives through the use of logical tunnels to stitch functions to provide the services noted above.

When TLS/SSL/IPSec termination with authentication and secure transporting via cloud policy are offloaded to hardware-based appliances, functions pertaining to traffic steering can be performed with fewer servers. Many of the functions that can be offloaded to the appliances can allow for a significant amount of processing to be offloaded. This can allow for capacity at an edge, for example, to be optimized to the appropriate levels of processing for each function separately. A single rack, for example, can be implemented with 8 servers or less rather than 24 servers, allowing for considerable savings in power, space, and cost. The operational cost can be lower as the space and power for the edge is often leased from a third party and can be constrained.

In some embodiments, a combination switch/appliance device may be implemented that can be implemented in a dual-redundant fashion for high availability (HA) purposes and a smaller number of servers may be implemented to support millions of external connections to access the cloud with high performance and functionality. The number of servers and the capacity of the appliance may be sized as needed for specific scenarios.

Because the described functions are disaggregated, servers can be added or deleted and appliances may be swapped out as necessary. Each of the described edge functions can be designed and deployed optimally for the function and scale required. Additionally, disaggregation enables individual functions to be optimized at its own rate of development.

Disaggregation provides architectural flexibility to take advantage of dedicated processing provided by SmartNICs, smart switches, and/or smart appliances to extend the advantages to other computing and cloud functions. Stitching functions together with logical tunnels enables disaggregation of functions seamlessly across the processing domains. High speed high-capacity network switching enables lower cost of disaggregation with negligible latencies.

Referring to the appended drawings, in which like numerals represent like elements throughout the several FIGURES, aspects of various technologies for network disaggregation techniques and supporting technologies will be described. In the following detailed description, references are made to the accompanying drawings that form a part hereof, and which are shown by way of illustration specific configurations or examples.

FIG. 1 illustrates an example computing environment in which the embodiments described herein may be implemented. FIG. 1 illustrates a service provider 100 that is configured to provide computing resources to users at user site 140. The user site 140 may have user computers that may access services provided by service provider 100 via a network 130. The computing resources provided by the service provider 100 may include various types of resources, such as computing resources, data storage resources, data communication resources, and the like. For example, computing resources may be available as virtual machines. The virtual machines may be configured to execute applications, including Web servers, application servers, media servers, database servers, and the like. Data storage resources may include file storage devices, block storage devices, and the like. Networking resources may include virtual networking, software load balancer, and the like.

Service provider 100 may have various computing resources including servers, routers, and other devices that may provide remotely accessible computing and network resources using, for example, virtual machines. Other resources that may be provided include data storage resources. Service provider 100 may also execute functions that manage and control allocation of network resources, such as a network manager 110.

Network 130 may, for example, be a publicly accessible network of linked networks and may be operated by various entities, such as the Internet. In other embodiments, network 130 may be a private network, such as a dedicated network that is wholly or partially inaccessible to the public. Network 130 may provide access to computers and other devices at the user site 140.

Figure 2:
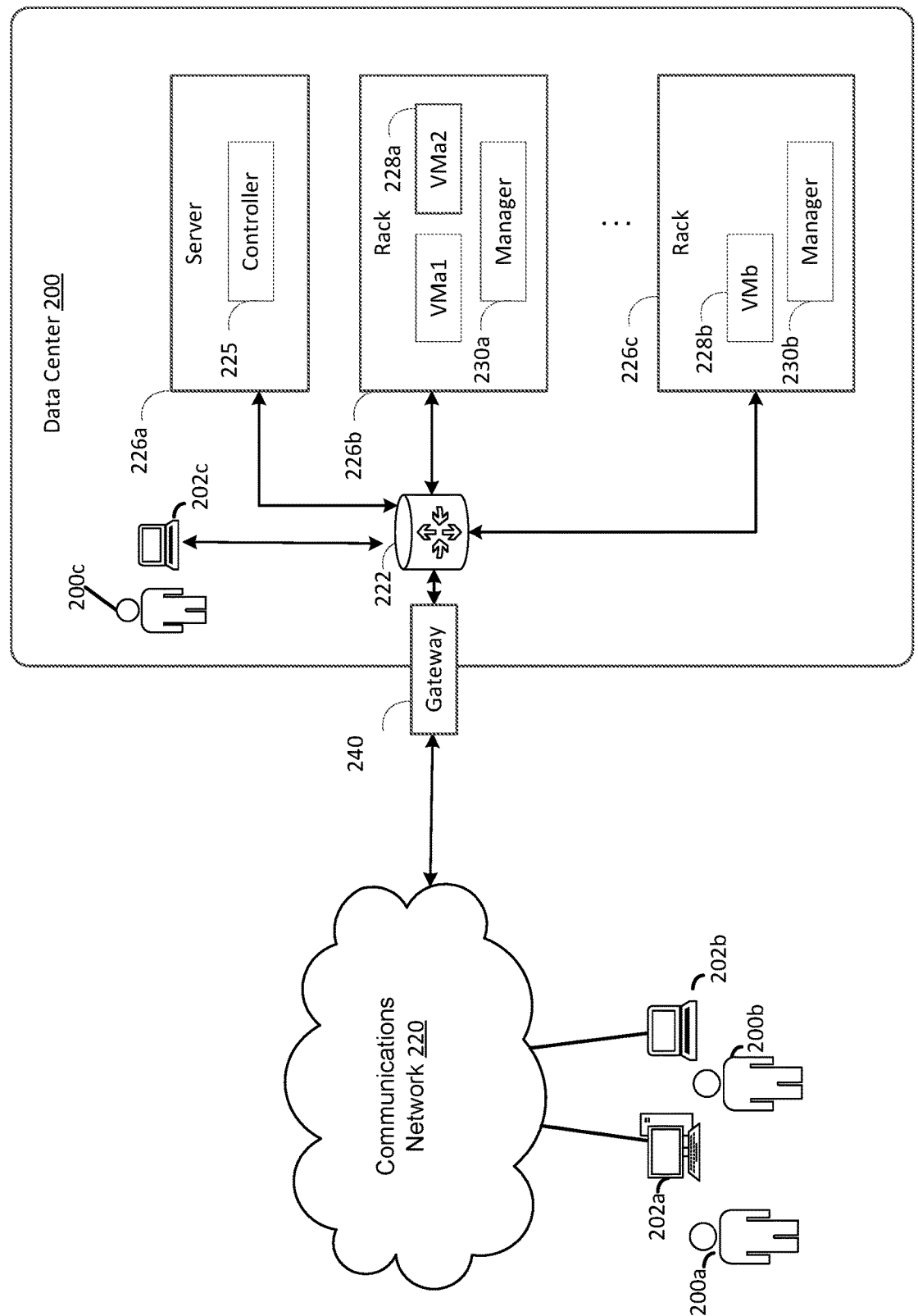
FIG. 2 is a diagram illustrating a data center in accordance with the present disclosure.

FIG. 2 illustrates an example computing environment in which the embodiments described herein may be implemented. FIG. 2 illustrates a data center 200 that is configured to provide computing resources to users 200a, 200b, or 200c (which may be referred herein singularly as "a user 200" or in the plural as "the users 200") via user computers 202a, 202b, and 202c (which may be referred herein singularly as "a computer 202" or in the plural as "the computers 202") via a communications network 220. The computing resources provided by the data center 200 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 200 may correspond to service provider 100 in FIGS. 1 and 2, or edge site 150 of FIG. 2. Data center 200 may include servers 226a, 226b, and 226c (which may be referred to herein singularly as "a server 226" or in the plural as "the servers 226") that may be standalone or installed in server racks, and provide computing resources available as virtual machines 228a and 228b (which may be referred to herein singularly as "a virtual machine 228" or in the plural as "the virtual machines 228"). The virtual machines 228 may be configured to execute applications such as Web servers, application servers, media servers, database servers, and the like. Other resources that may be provided include data storage resources (not shown on FIG. 2) and may include file storage devices, block storage devices, and the like. Servers 226 may also execute functions that manage and control allocation of resources in the data center, such as a controller 225. Controller 225 may be a fabric controller or another type of program configured to manage the allocation of virtual machines on servers 226.

Referring to FIG. 2, communications network 220 may, for example, be a publicly accessible network of linked networks and may be operated by various entities, such as the Internet. In other embodiments, communications network 220 may be a private network, such as a corporate network that is wholly or partially inaccessible to the public.

Communications network 220 may provide access to computers 202. Computers 202 may be computers utilized by users 200. Computer 202a, 202b or 202c may be a server, a desktop or laptop personal computer, a tablet computer, a smartphone, a set-top box, or any other computing device capable of accessing data center 200. User computer 202a or 202b may connect directly to the Internet (e.g., via a cable modem). User computer 202c may be internal to the data center 200 and may connect directly to the resources in the data center 200 via internal networks. Although only three user computers 202a, 202b, and 202c are depicted, it should be appreciated that there may be multiple user computers.

Computers 202 may also be utilized to configure aspects of the computing resources provided by data center 200. For example, data center 200 may provide a Web interface through which aspects of its operation may be configured through the use of a Web browser application program executing on user computer 202. Alternatively, a stand-alone application program executing on user computer 202 may be used to access an application programming interface (API) exposed by data center 200 for performing the configuration operations.

Servers 226 may be configured to provide the computing resources described above. One or more of the servers 226 may be configured to execute a manager 220a or 220b (which may be referred herein singularly as "a manager 220" or in the plural as "the managers 220") configured to execute the virtual machines. The managers 220 may be a virtual machine monitor (VMM), fabric controller, or another type of program configured to enable the execution of virtual machines 228 on servers 226, for example.

It should be appreciated that although the embodiments disclosed above are discussed in the context of virtual machines, other types of implementations can be utilized with the concepts and technologies disclosed herein.

In the example data center 200 shown in FIG. 2, a network device 222 may be utilized to interconnect the servers 226a and 226b. Network device 222 may comprise one or more switches, routers, or other network devices. Network device 222 may also be connected to gateway 240, which is connected to communications network 220. Network device 222 may facilitate communications within networks in data center 200, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 2 has been greatly simplified and that many more networks and networking devices may be utilized to interconnect the various computing systems disclosed herein. These network topologies and devices should be apparent to those skilled in the art.

It should also be appreciated that data center 200 described in FIG. 2 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 3:
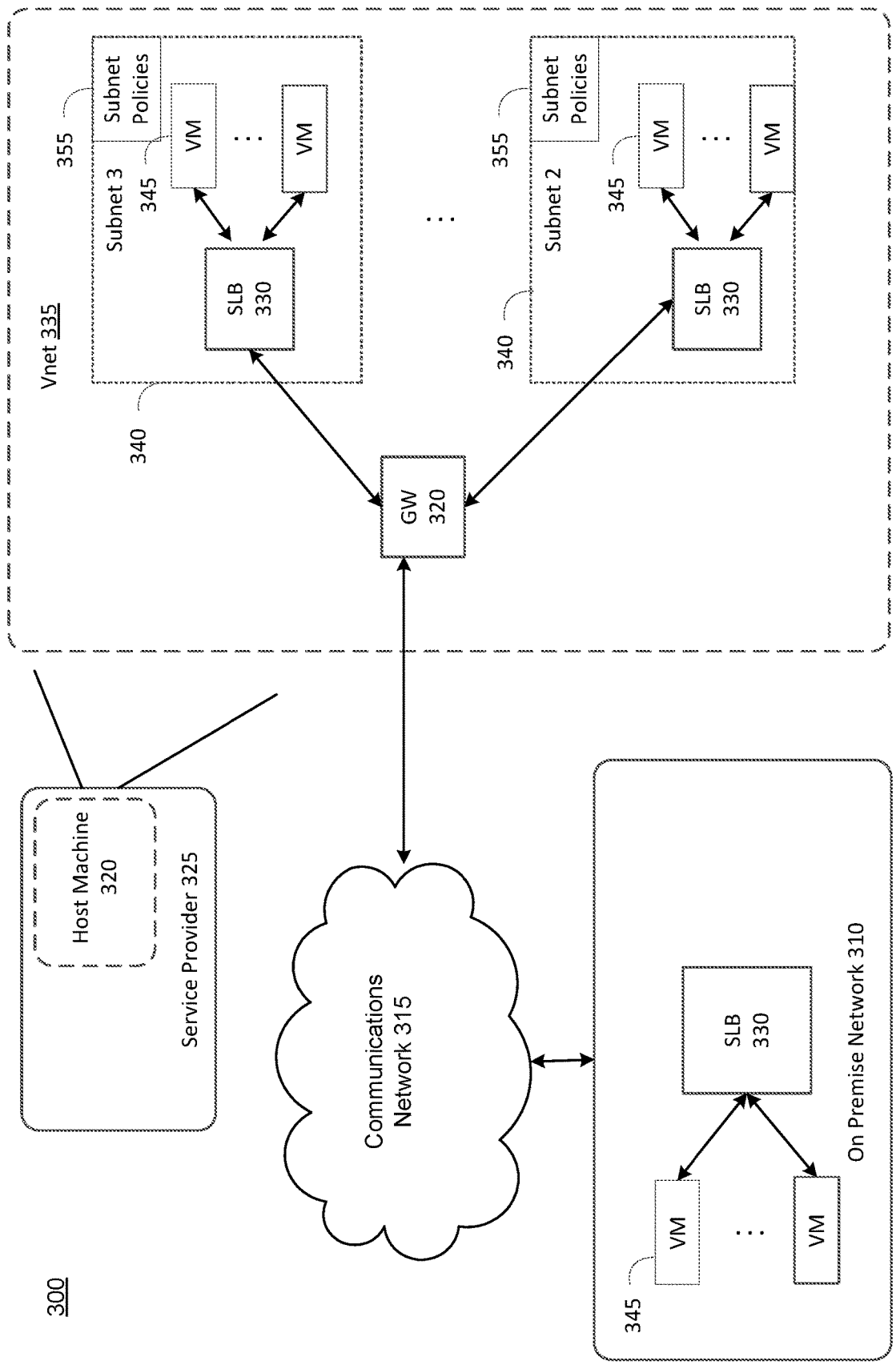
FIG. 3 is a diagram illustrating an architecture for implementing virtual services in accordance with the present disclosure.

FIG. 3 shows an illustrative cloud computing environment 300 in which a customer network includes multiple portions including an on-premises network 310 and a virtual network (VNet) 335. The customer network in this example is a hybrid network but other network configurations may also be utilized depending on the particular requirements of the user scenario. The VNet may be physically implemented using one or more host machines that are operated by a cloud service provider. It is noted that the diagram in FIG. 3 is simplified for clarity in exposition and typical networking equipment such as firewalls, routers, and the like are not shown.

The on-premises network and VNet are typically operatively coupled using instances of gateways 320, or other networking devices, over a communication network 315 which may include, for example, private and/or public networking infrastructure using various combinations of connectivity services. The VNet may include multiple subnets 340 that each include one or more instances of virtual machines 345 that are typically connected using load balancers 330 and/or other networking devices. Security and other networking policies (collectively indicated by reference numeral 355) are typically applicable to each subnet. The networking policies are typically different for each subnet, but they can be the same and/or overlap in some cases.

The cloud computing environment 300 may be provided via a data center configured to provide computing resources to users via communications network 335. The computing resources provided by the data center may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

The data center may include servers that may be standalone or installed in server racks, and provide computing resources available as virtual machines 345. The virtual machines 345 may be configured to execute applications such as Web servers, application servers, media servers, database servers, and the like. Other resources that may be provided include data storage resources may include file storage devices, block storage devices, and the like. The communications network 335 may, for example, be a publicly accessible network of linked networks and may be operated by various entities, such as the Internet. In other embodiments, communications network 335 may be a private network, such as a corporate network that is wholly or partially inaccessible to the public.

Communications network 315 may provide access to various computers that may be a server, a desktop or laptop personal computer, a tablet computer, a smartphone, a set-top box, or any other computing device capable of accessing the data center.

In the example cloud computing environment 300, a network device may be utilized to interconnect the servers. The network device may comprise one or more switches, routers, or other network devices. The network device may facilitate communications within networks in the data center, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 3 has been greatly simplified and that many more networks and networking devices may be utilized to interconnect the various computing systems disclosed herein. These network topologies and devices should be apparent to those skilled in the art.

It should also be appreciated that data center 300 described in FIG. 3 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

In some embodiments, aspects of the present disclosure may be implemented in a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provide federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

Figure 4:
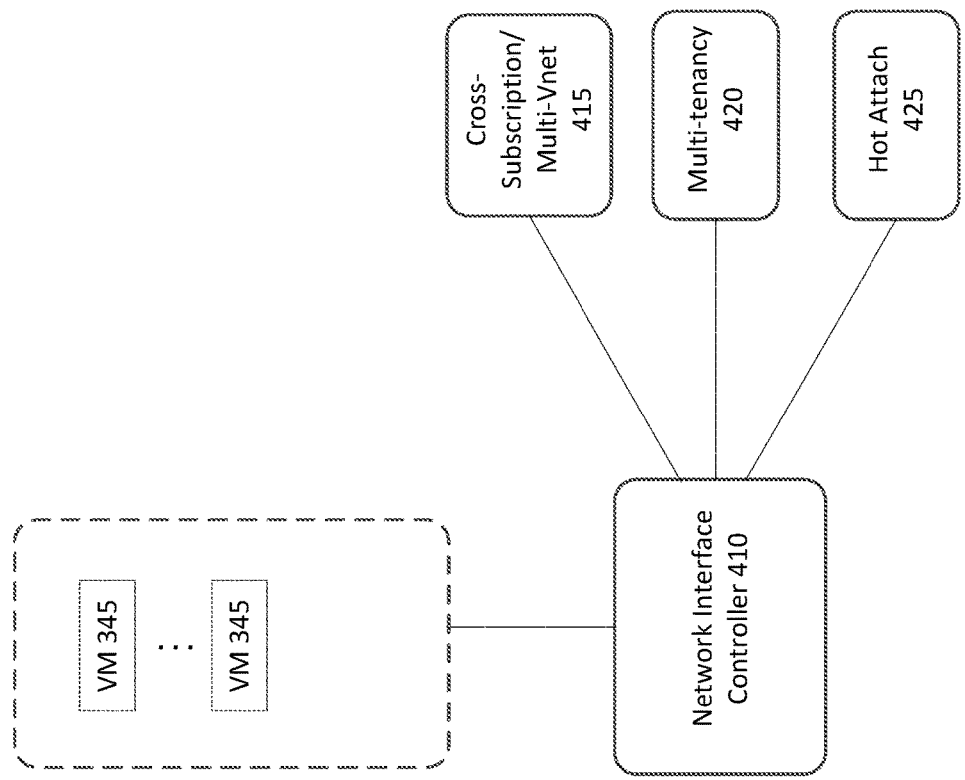
FIG. 4 is a diagram illustrating an example network interface card in accordance with the present disclosure.

FIG. 4 shows an illustrative NIC 410 that may be utilized to support a variety of scenarios. The NIC may be implemented in this example as virtualization of a network interface at the host supporting the VM 345 using a container model, although physical embodiments may be utilized in some scenarios. The NIC 410 provides identity, connectivity, and discoverability for the VMs in the customer's VNet. The NIC 410 enables flexibility for various VM deployment scenarios. The flexibility enables rapid provisioning of a variety of cloud-computing features and services on an on-demand basis without needing to alter the fundamental workflow in a given VM/VNet/subnet while conforming with applicable networking policies.

As shown in FIG. 4, the use scenarios illustratively include, for example, cross-subscriptions and multi-VNet homing 415, multi-tenancy and subnet sharing 420, and pre-provisioning of resources or "hot attach" 425. As used herein, the NIC 410 may be a SmartNIC or SkinnyNIC, the features of which are further described herein.

Figure 5:
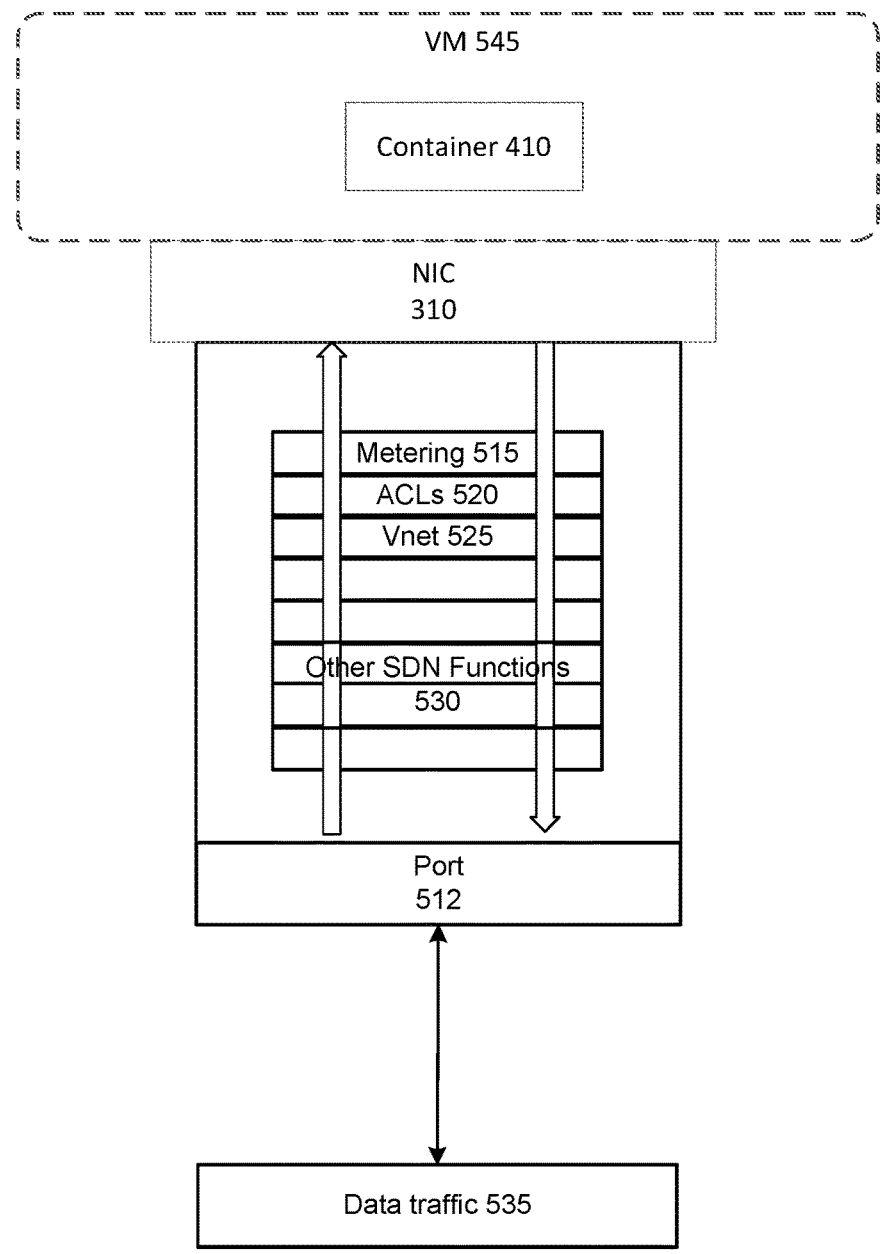
FIG. 5 is a diagram illustrating an example architecture in accordance with the present disclosure.

FIG. 5 shows an example functional flow for a programmable connection processing and switching function 500 that enables data path isolation in a multi-tenant architecture by enforcing specific networking policies, which may be implemented in a SmartNIC as further described herein. The programmable connection processing and switching function 500 may provide capabilities to enforce policies and transform or tunnel data packets in a given computing workload that are entering and leaving VM 545. Case connections or flows are created by the programmable hardware of the programmable connection processing and switching function 500 and entered into a flow table that allows that connection/flow to be switched/encapsulated without the same inspection.

The networking policy functions may include those, in this example, relating to metering 515, access control lists (ACLs) 520, VNet addressing/routing 525, and other various SDN functions or features 530 which may include, for example, those pertaining to routing, tunneling, filtering, address translation, encryption, decryption, encapsulation, de-encapsulation, or quality of service (QoS).

In some of the illustrated example scenarios described herein, SDN capabilities may be enhanced by disaggregating policy enforcement from the host and moving it elsewhere on the network, such as onto an SDN appliance. Software defined networking (SDN) is conventionally implemented on a general-purpose compute node. The SDN control plane may program the host to provide core network functions such as security, virtual network, and load balancer policies. In some implementations that use a rack level switch such as a top-of-rack (ToR) switch, such devices typically do not have the capability to perform transforms. An SDN appliance can be used to host these agents and provide switch functionality, and can further provide transformations and connectivity. The SDN appliance can accept policies that perform transformations. In some embodiments, an agent can be implemented that programs the drivers that run on the SDN appliance. The traffic sent by workloads can be directed through the SDN appliance, which can apply policies and perform transformations on the traffic and send the traffic to the destination. In some configurations, the SDN appliance may include a virtual switch such as a virtual filtering platform.

It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

A component may also encompass other ways of leveraging a device to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. A component may represent a homogeneous collection of hardware acceleration devices, such as, for example, FPGA devices. On the other hand, a component may represent a heterogeneous collection of different types of hardware acceleration devices including different types of FPGA devices having different respective processing capabilities and architectures, a mixture of FPGA devices and other types hardware acceleration devices, etc.

Figure 6:
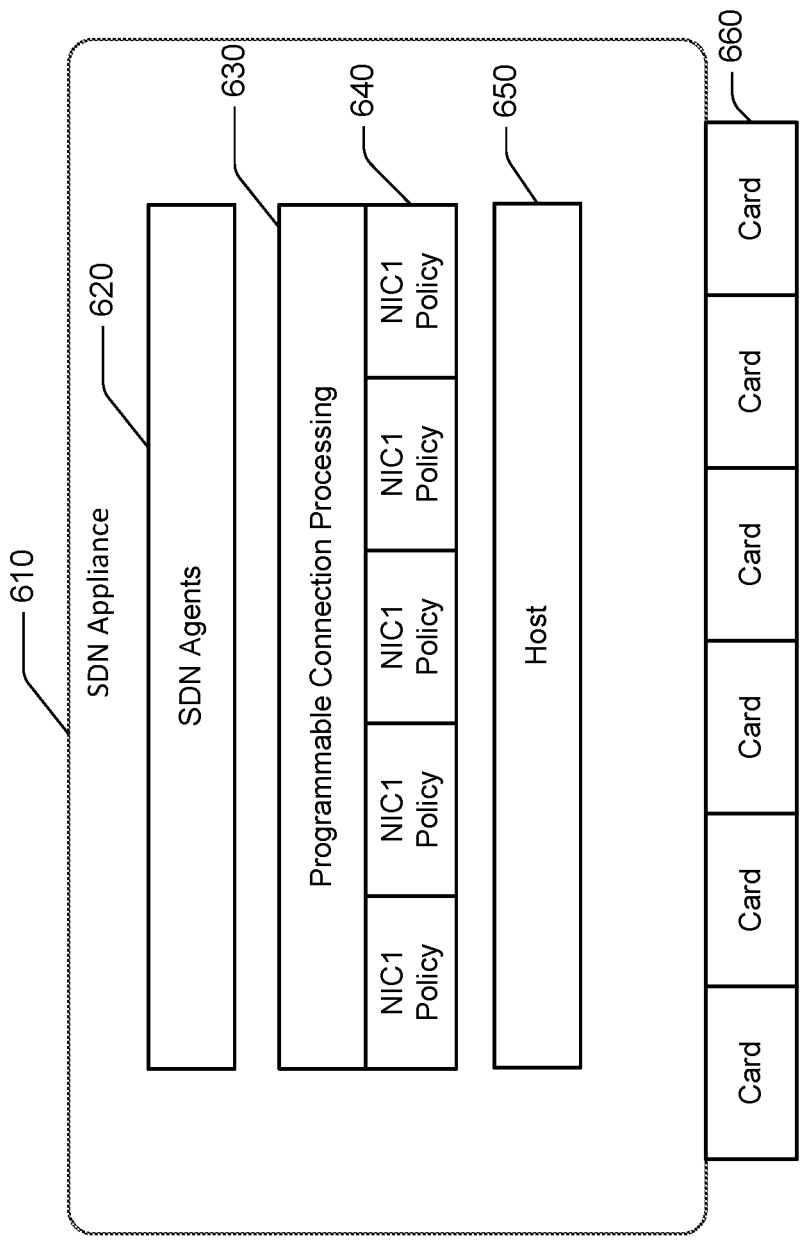
FIG. 6 is a diagram illustrating an example architecture in accordance with the present disclosure.

Referring to FIG. 6, illustrated is an example of an SDN appliance 610 that can enable disaggregation according to some embodiments. In some embodiments, the SDN appliance 610 may enable the use of the SDN control plane to manage network devices while providing high availability and fault tolerance, as further described herein. FIG. 6 illustrates one example of a network optimized chassis including SDN agents 620, a function capable of performing network transforms such as a programmable connection processing and switching function 630, policies 640, and cards (e.g., FPGAs) 650. The various embodiments described herein show the use of the SDN appliance as a general concept.

Figure 7:
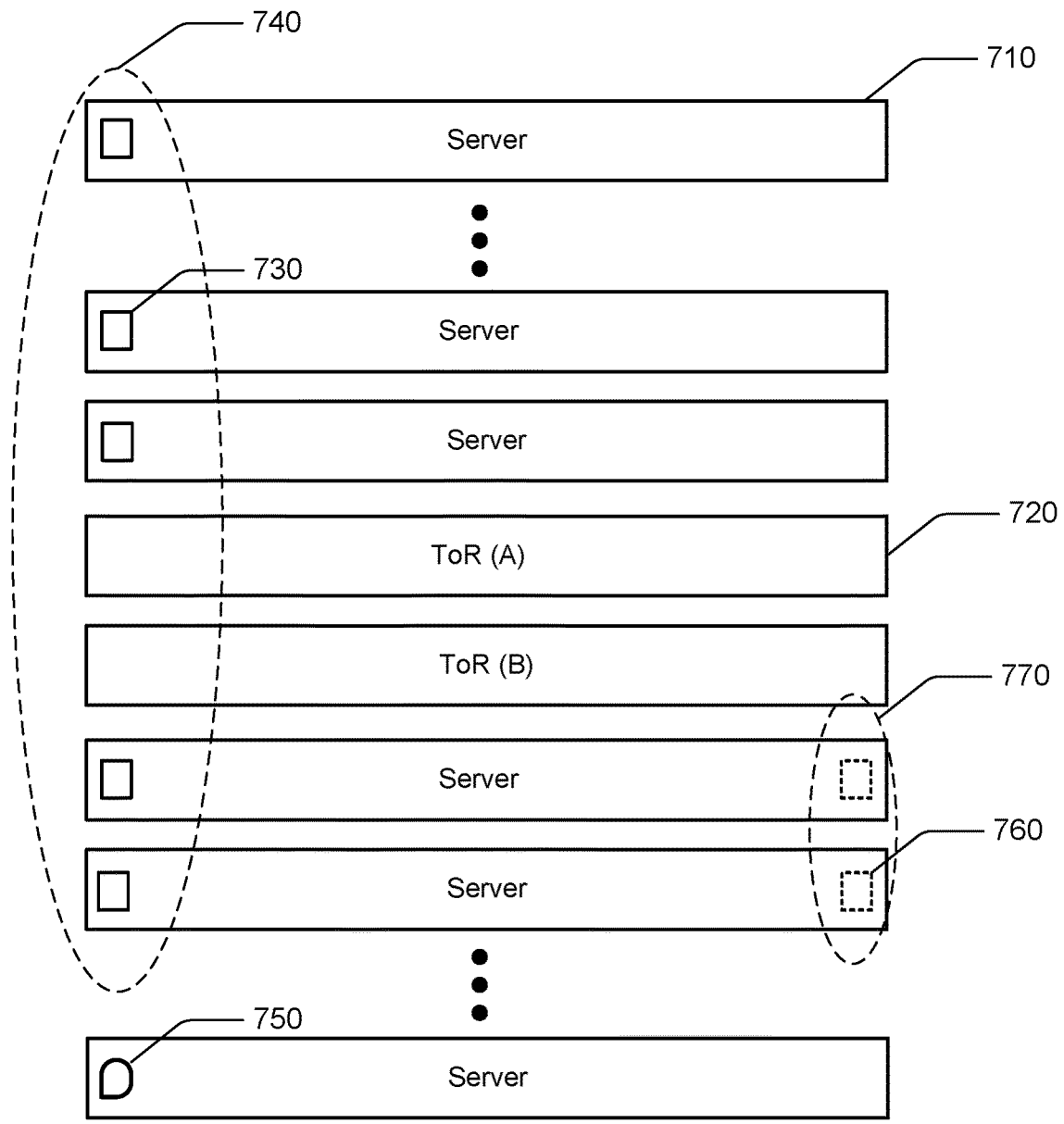
FIG. 7 is a diagram illustrating an example architecture in accordance with the present disclosure.

With reference to FIG. 7, illustrated is an example of implementing various hardware and software-based processing elements in a virtual or distributed fashion to provide the disclosed disaggregated implementation approach. Such an architecture may include a combination of SmartNICs, SkinnyNICs, SDN appliances, and servers running various functions in software. For example, TLS/SSL/IPSec termination with authentication and secure transporting of user traffic with policy application may be implemented in at least some of the hardware components such as SmartNICs. Steering user connections to the desired cloud resource may be implemented in software processes. Such functions, for example, may be hosted in one of the servers 710. In the example shown in FIG. 7, SmartNICs 730 may be distributed in servers 710. In some embodiments, SmartNICs 730 may be housed in a separate physical assembly. In the example of FIG. 7, at least some of the servers 710 in the data center smart rack 700 may contain a SmartNIC 730. Some of the servers 710 may contain a conventional NIC 750. Additionally, some of the servers 710 may include cloud edge software agents 760 for providing services such as user connection steering.

In an embodiment, SmartNICs 730 may be pooled into a SmartNIC pool 740 to provide disaggregated and pooled services for connections not only pertaining to servers 710 but also for data flows from other servers. In an embodiment, cloud edge software agents 760 may be pooled into a cloud edge software agents pool 770 to provide disaggregated and pooled services for connections not only pertaining to servers 710 but also for data flows from other servers.

Figure 8:
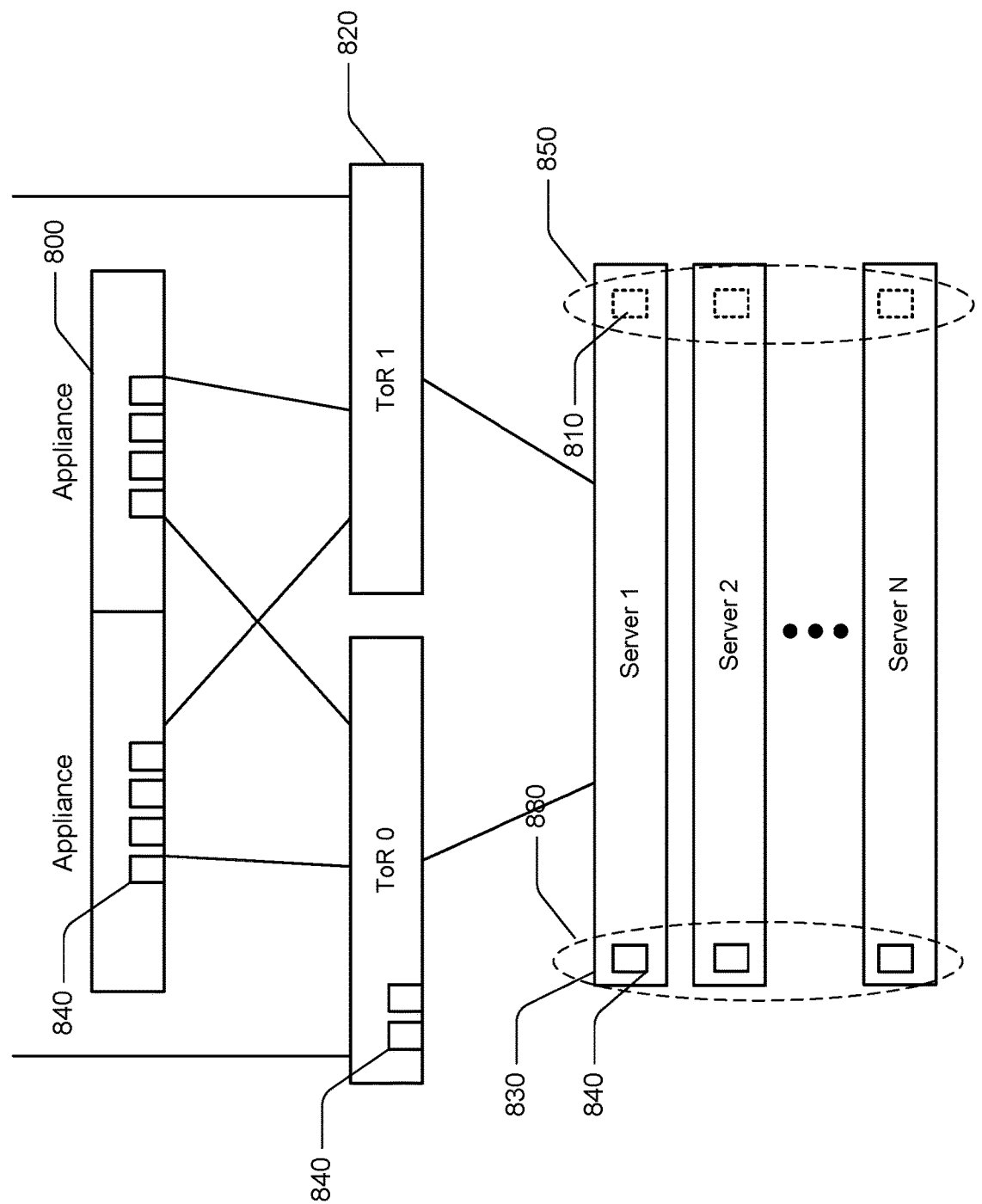
FIG. 8 is a diagram illustrating an example architecture in accordance with the present disclosure.

With reference to FIG. 8, illustrated is an example of implementing various hardware and software-based processing elements in a virtual or distributed fashion to provide the disclosed disaggregated implementation approach. In one implementation, smartNICs 840 may be pooled into a SmartNIC pool 880 to provide disaggregated and pooled services for connections not only pertaining to servers 830 but also for data flows from other servers. In an embodiment, the SmartNIC pool 880 may be cost optimized. FIG. 8 further illustrates an example of a fault tolerant scheme that is resilient to ToR failure. In an embodiment, each ToR 820 may be fully connected to each server 830. FIG. 8 also shows that smartNICs 840 may be configured on appliances 800 or ToRs 820, for example. The smartNICs 840 configured on appliances 800 or ToRs 820 may be pooled in SmartNIC pool 880 or they may be pooled separately. Some of the servers 830 may include cloud edge software agents 810 for providing services such as user connection steering. In an embodiment, cloud edge software agents 810 may be pooled into a cloud edge software agents pool 850 to provide disaggregated and pooled services for connections not only pertaining to servers 830 but also for data flows from other servers.

Figure 9:
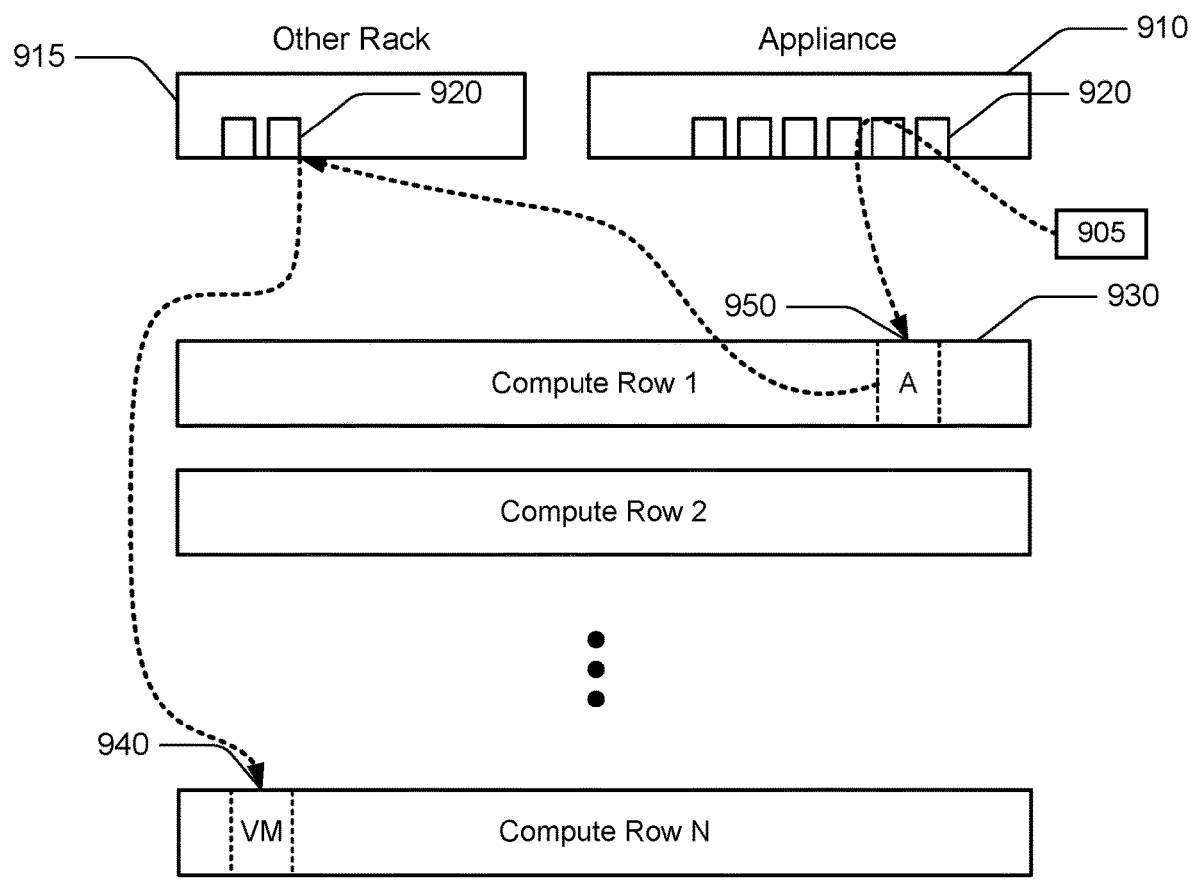
FIG. 9 is a diagram illustrating an example architecture in accordance with the present disclosure.

With reference to FIG. 9, illustrated is an example of a data center environment 900 with an SDN appliance 910 having one or more smart NICs 920 and a rack 915 also having one or more smart NICs 920. Also illustrated are a plurality of compute rows 930 having servers, at least one of which has a cloud edge software agent 950. Any virtual machine 940 running on any server in the data center rack can utilize the smart NICs 920 on SDN appliance 910 or smart NICs 920 on rack 915 or cloud edge software agent 950 on servers on compute row 930. A data packet 905 that enters a cloud edge may have TLS/SSL/IPSec termination with authentication performed by one of the SmartNICs 920 on appliance 910. This may be followed by steering the user connection to the desired cloud resource by cloud edge software agent 950 on compute row 930. Secure transport may be implemented using logical tunnels via cloud policy to the appropriate cloud environment by another SmartNIC 920 on rack 915.

Figure 10:
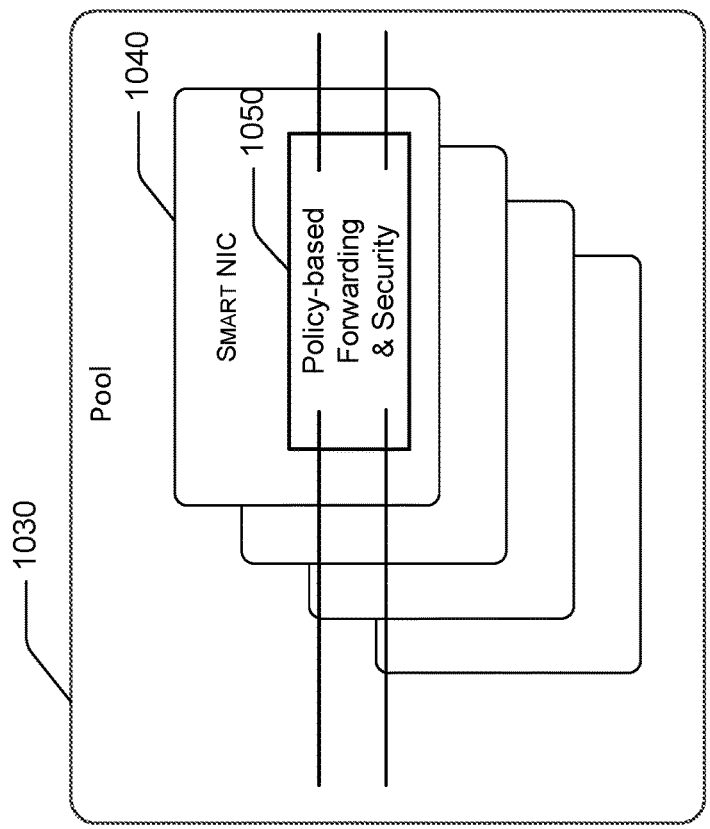
FIG. 10 is a diagram illustrating an example architecture in accordance with the present disclosure.
Figure 10:
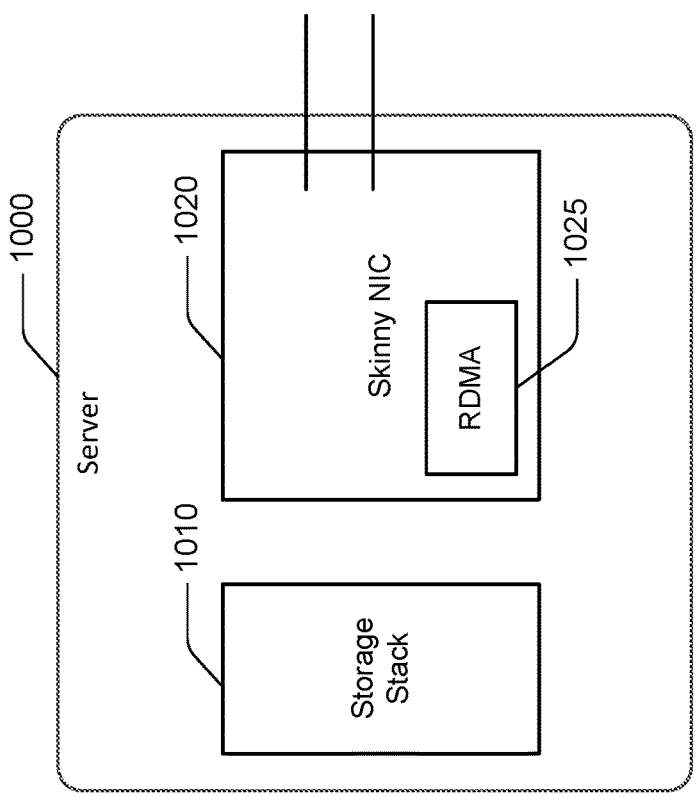

With reference to FIG. 10, the left side of the figure shows a standard or skinny NIC 1020 that provides RDMA offload functionality 1025 and connectivity to the appliance. Networking traffic may be tunneled to the SmartNIC pool 1030. The right side of the figure shows stateful network policy-based forwarding and security 1050 performed by SmartNICs 1040.

Figure 11:
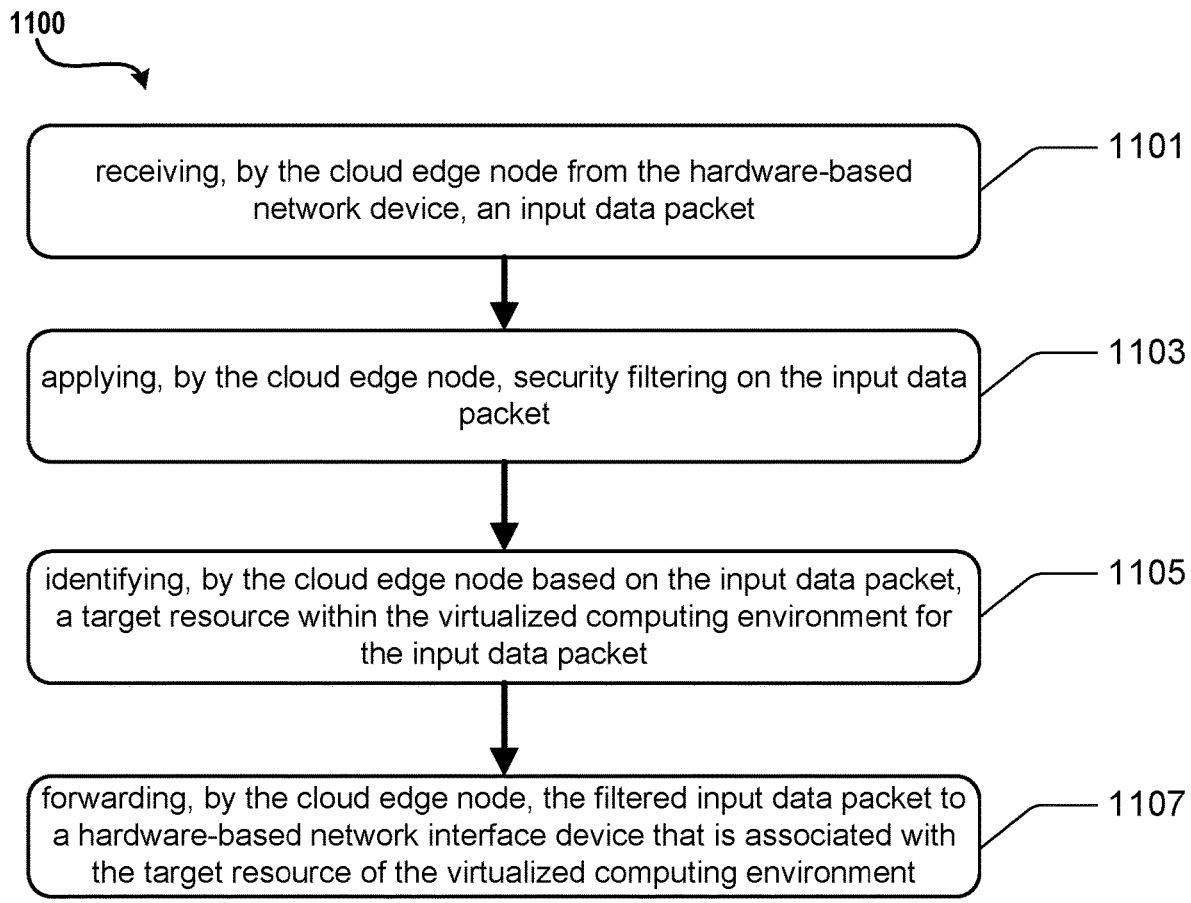
FIG. 11 is a flowchart depicting an example procedure in accordance with the present disclosure.

Turning now to FIG. 11, illustrated is an example operational procedure for processing data packets in a virtualized computing environment. The virtualized computing environment comprises a plurality of computing nodes, hardware-based network devices, and hardware-based network interface devices configured to implement a software defined network (SDN). The computing nodes include a cloud edge node configured to provide at least one cloud edge processing function for incoming data packets The hardware-based network interface devices are configured to enable communications between virtual machines within a customer network of the virtualized computing environment in accordance with associated policies. Such an operational procedure can be provided by one or more components illustrated in FIGS. 1 through 10. The operational procedure may be implemented in a system comprising one or more computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 1600 is described as running on a system, it can be appreciated that the routine 1600 and other operations described herein can be executed on an individual computing device or several devices.

Referring to FIG. 11, operation 1101 illustrates receiving, by the cloud edge node from the hardware-based network device, an input data packet generated by performing, by the hardware-based network device, network termination and authentication of a data packet received from a node outside of the virtualized computing environment. In an embodiment, the data packet is addressed to an endpoint hosted by a virtual machine of the customer network.

Operation 1101 may be followed by operation 1103. Operation 1103 illustrates applying, by the cloud edge node, security filtering on the input data packet.

Operation 1103 may be followed by operation 1105. Operation 1105 illustrates identifying, by the cloud edge node based on the input data packet, a target resource within the virtualized computing environment for the input data packet.

Operation 1105 may be followed by operation 1107. Operation 1107 illustrates forwarding, by the cloud edge node, the filtered input data packet to a hardware-based network interface device that is associated with the target resource of the virtualized computing environment.

In an embodiment, the hardware-based network interface device is configured to apply a policy associated with the filtered input data packet and securely transport the filtered input data packet to the endpoint hosted by the virtual machine of the customer network.

In an embodiment, the hardware-based network device, cloud edge node, and hardware-based network interface device are disaggregated from physical dependencies on particular computing nodes that are hosting the virtual machines of the customer network.

Figure 12:
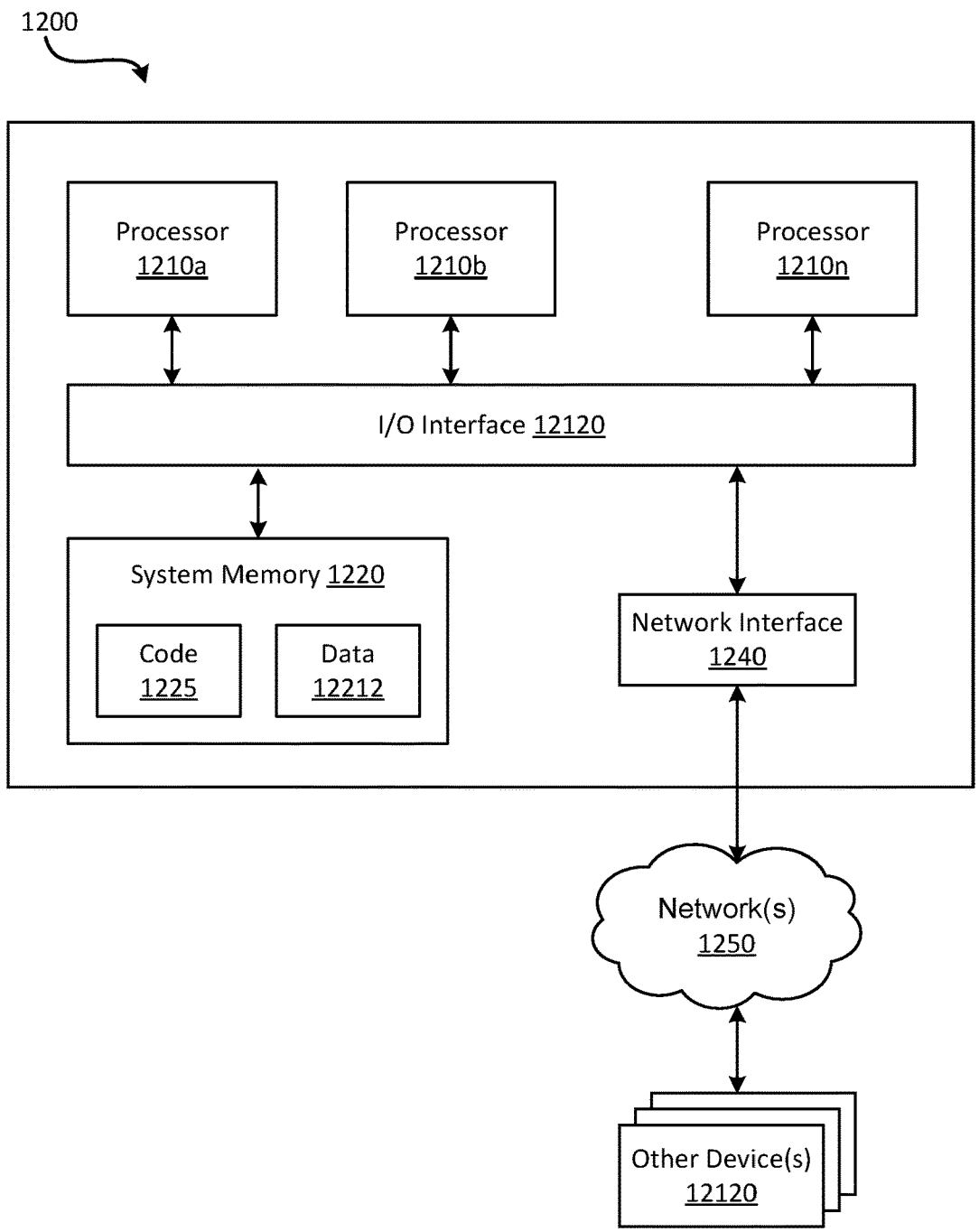
FIG. 12 is an example computing system in accordance with the present disclosure.

FIG. 12 illustrates a general-purpose computing device 1200. In the illustrated embodiment, computing device 1200 includes one or more processors 1210*a*, 1210*b*, and/or 1210*n* (which may be referred herein singularly as "a processor 1210" or in the plural as "the processors 1210") coupled to a system memory 1212 via an input/output (I/O) interface 1230. Computing device 1200 further includes a network interface 1240 coupled to I/O interface 1230.

In various embodiments, computing device 1200 may be a uniprocessor system including one processor 1210 or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x1212, PowerPC, SPARC, or MIPS ISAs, or any other suitable ISA. In multiprocessor systems, each of processors 1210 may commonly, but not necessarily, implement the same ISA.

System memory 1212 may be configured to store instructions and data accessible by processor(s) 1210. In various embodiments, system memory 1212 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 1220 as code 1225 and data 12212.

In one embodiment, I/O interface 1230 may be configured to coordinate I/O traffic between the processor 1210, system memory 1212, and any peripheral devices in the device, including network interface 1240 or other peripheral interfaces. In some embodiments, I/O interface 1230 may perform any necessary protocol, timing, or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components. Also, in some embodiments some or all of the functionality of I/O interface 1230, such as an interface to system memory 1220, may be incorporated directly into processor 1210.

Network interface 1240 may be configured to allow data to be exchanged between computing device 1200 and other device or devices 12120 attached to a network or network(s) 12120, such as other computer systems or devices as illustrated in FIGS. 1 through 5, for example. In various embodiments, network interface 1240 may support communication via any suitable wired or wireless general data networks, such as types of Ethernet networks, for example. Additionally, network interface 1240 may support communication via telecommunications/telephony networks such as analog voice networks or digital fiber communications networks, via storage area networks such as Fibre Channel SANs or via any other suitable type of network and/or protocol.

In some embodiments, system memory 1220 may be one embodiment of a computer-accessible medium configured to store program instructions and data as described above for the Figures for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 1200 via I/O interface 1230. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 1200 as system memory 1220 or another type of memory. Further, a computer-accessible medium may include transmission media or signals such as electrical, electromagnetic or digital signals, conveyed via a communication medium such as a network and/or a wireless link, such as may be implemented via network interface 1240. Portions or all of multiple computing devices, such as those illustrated in FIG. 12, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 12, may include other components that are not explicitly shown in FIG. 12, or may utilize an architecture completely different than that shown in FIG. 12.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

Although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A method for processing data packets in a virtualized computing environment comprising a plurality of computing nodes, hardware-based network devices, and hardware-based network interface devices configured to implement a software defined network (SDN), the computing nodes including a cloud edge node configured to provide at least one cloud edge processing function for incoming data packets, the hardware-based network interface devices configured to enable communications between virtual machines within a customer network of the virtualized computing environment in accordance with associated policies, the method comprising:

receiving, by the cloud edge node from the hardware-based network device, an input data packet generated by performing, by the hardware-based network device, network termination and authentication of a data packet received from a node outside of the virtualized computing environment, the data packet addressed to an endpoint hosted by a virtual machine of the customer network;

applying, by the cloud edge node, security filtering on the input data packet;

identifying, by the cloud edge node based on the input data packet, a target resource within the virtualized computing environment for the input data packet; and forwarding, by the cloud edge node, the filtered input data packet to a hardware-based network interface device that is associated with the target resource of the virtualized computing environment;

wherein the hardware-based network interface device is configured to apply a policy associated with the filtered input data packet and securely transport the filtered input data packet to the endpoint hosted by the virtual machine of the customer network;

wherein the hardware-based network device, cloud edge node, and hardware-based network interface device are disaggregated from physical dependencies on particular computing nodes that are hosting the virtual machines of the customer network.

Clause 2: The method of clause 1, wherein the hardware-based network device, cloud edge node, and hardware-based network interface device are physically distributed in the virtualized computing environment and configured as a pooled resource.

Clause 3: The method of any of clauses 1-2, wherein a plurality of the cloud edge processing functions are executed in a plurality of cloud edge nodes.

Clause 4: The method of any of clauses 1-3, wherein the network termination and authentication of the data packet comprises Secure Sockets Layer (SSL), Transport Layer Security (TLS), or Internet Protocol Security (IPSec) termination.

Clause 5: The method of any of clauses 1-4, wherein the security filtering comprises applying layer-7 inspection and distributed denial-of-service (DDoS) protection.

Clause 6: The method of any of clauses 1-5, wherein the securely transporting is performed using logical tunnels.

Clause 7: A system comprising:

a plurality of computing nodes communicatively coupled to network devices and network interface devices configured to implement a software defined network (SDN) in a virtualized computing environment, the plurality of computing nodes including a cloud edge node configured to provide at least one cloud edge processing function, the network interface devices configured to enable communications between virtual machines within a virtual private network of the virtualized computing environment in accordance with associated policies, wherein the network interface devices and the cloud edge nodes are disaggregated from dependencies on particular computing nodes that are hosting the virtual machines;

the system configured to:

receiving, at the network device from a node outside of the virtualized computing environment, a data packet addressed to an endpoint hosted by one of the virtual machines in the virtual private network;

performing, by the network device, network termination and authentication of the data packet to generate an input data packet, wherein the network device is configured to perform the network termination and authentication on hardware-based components in the network device;

sending, by the network device, the input data packet to the cloud edge node;

applying, by the cloud edge node, security filtering on the input data packet;

identifying, by the cloud edge node based on the input data packet, a target resource within the virtualized computing environment for the input data packet;

forwarding, by the cloud edge node, the filtered input data packet to a network interface device that is associated with the target resource of the virtualized computing environment;

based on a policy associated with the filtered input data packet, applying, by the network interface device that is associated with the target resource, the policy to the filtered input data packet; and securely transporting, based on the policy applied by the network interface device that is associated with the target resource, the filtered input data packet to the endpoint hosted by the one virtual machine in the virtual private network.

Clause 8: The system of clause 7, wherein the network termination and authentication of the data packet comprises Secure Sockets Layer (SSL), Transport Layer Security (TLS), or Internet Protocol Security (IPSec) termination.

Clause 9: The system of any of clauses 7 and 8, wherein the security filtering comprises applying layer-7 inspection and distributed denial-of-service (DDoS) protection.

Clause 10: The system of any clauses 7-9, wherein the securely transporting is performed using logical tunnels Clause 11: The system of any clauses 7-10, wherein the network devices and network interface devices are physically distributed in the virtual computing environment and the network devices and network interface devices are configured as pooled resources.

Clause 12: The system of any clauses 7-11, wherein a plurality of the cloud edge processing functions are executed in a plurality of cloud edge nodes of the computing environment.

Clause 13: The system of any clauses 7-12, wherein a number of the computing nodes in the computing environment is determined based on power and bandwidth constraints.

Clause 14: The system of any clauses 7-13, wherein the network interface devices comprise SmartNICs.

Clause 15: A system comprising:
a plurality of computing nodes communicatively coupled to a plurality of network devices and network interface devices configured to implement a software defined network (SDN) in a virtualized computing environment, wherein:
the computing nodes include a cloud edge node configured to provide at least one cloud edge processing function,
the network interface devices are configured to enable communications between virtual machines within a virtual network of the virtualized computing environment in accordance with associated policies, and
the network devices, network interface devices, and the processing function are disaggregated from dependencies on particular computing nodes that are hosting the virtual machines;
the system configured to:
perform, by one of the network devices, network termination and authentication of a data packet addressed to an endpoint hosted by one of the virtual machines in a virtual network of the virtualized computing environment;
send, by the one network device, the data packet to a cloud edge node configured to perform data packet routing;
process, by the cloud edge node, the data packet to determine a target resource of the virtualized computing environment that is associated with the data packet;
forward, by the cloud edge node, the data packet to a network interface device that is associated with the target resource, the network interface device identified based on the processing of the data packet;
apply, by the network interface device associated with the target resource, a policy associated with the data packet to generate a processed data packet; and
securely transport, by the network interface device associated with the target resource, to the one virtual machine in the virtual network based on the applied policy.

Clause 16: The computing environment of clause 15, wherein the network devices and network interface devices are physically distributed in the virtualized computing environment and the network devices and network interface devices are configured as pooled resources.

Clause 17: The computing environment of any of clauses 15 and 16, wherein a plurality of the cloud edge processing functions is executed in a plurality of computing nodes of the virtualized computing environment.

Clause 18: The computing environment of any of the clauses 15-17, wherein the network termination and authentication of the data packet comprises Secure Sockets Layer (SSL), Transport Layer Security (TLS), or Internet Protocol Security (IPSec) termination.

Clause 19: The computing environment of any of the clauses 15-18, wherein the processing the data packet comprises applying layer-7 inspection and distributed denial-of-service (DDoS) protection.

Clause 20: The computing environment of any of the clauses 15-19, wherein the securely transporting is performed using logical tunnels.

What is claimed is:

1. A method for processing data packets in a virtualized computing environment comprising a plurality of computing nodes and smart network interface cards (SmartNICs) configured to implement a software defined network (SDN), the computing nodes including a cloud edge node configured to provide at least one cloud edge processing function for incoming data packets, the SmartNICs configured to enable communications between virtual machines within a customer network of the virtualized computing environment and applying associated policies, the method comprising:
receiving, by the cloud edge node from a first SmartNIC, an input data packet generated by performing, by the first SmartNIC, network termination and authentication of a data packet received from a node outside of the virtualized computing environment, the data packet addressed to an endpoint hosted by a virtual machine of the customer network, the SmartNIC comprising a hardware-based acceleration device configured to perform cryptographic and authentication processes of the network termination and authentication using one or more of ASIC logic, ASIC processors, configurable FPGA logic, or FPGA software processor overlays;
applying, by the cloud edge node, security filtering on the input data packet;
identifying, by the cloud edge node based on the input data packet, a target resource within the virtualized computing environment for the input data packet; and
forwarding, by the cloud edge node, the filtered input data packet to a second SmartNIC that is associated with the target resource of the virtualized computing environment;
wherein the second SmartNIC is configured to apply a policy associated with the filtered input data packet and securely transport the filtered input data packet to the endpoint hosted by the virtual machine of the customer network;
wherein the first and second SmartNICs and the cloud edge node are disaggregated from physical dependencies on particular computing nodes that are hosting the virtual machines of the customer network;
wherein the first SmartNIC, cloud edge node, and second SmartNIC are physically distributed in the virtualized computing environment and configured as a logically pooled resource independent of the physical distribution, the logically pooled resource configured to provide disaggregated services for data flows associated with the plurality of computing nodes.

2. The method of claim 1, wherein a plurality of the cloud edge processing functions are executed in a plurality of cloud edge nodes.

3. The method of claim 1, wherein the network termination and authentication of the data packet comprises Secure Sockets Layer (SSL), Transport Layer Security (TLS), or Internet Protocol Security (IPSec) termination.

4. The method of claim 1, wherein the security filtering comprises applying layer-7 inspection and distributed denial-of-service (DDoS) protection.

5. The method of claim 1, wherein the securely transporting is performed using logical tunnels.

6. A system comprising:
a plurality of computing nodes communicatively coupled to SmartNICs configured to implement a software defined network (SDN) in a virtualized computing environment, the plurality of computing nodes including a cloud edge node configured to provide at least one cloud edge processing function, the SmartNICs configured to enable communications between virtual machines within a virtual private network of the virtualized computing environment in accordance with associated policies, wherein the SmartNICs and the cloud edge nodes are disaggregated from dependencies on particular computing nodes that are hosting the virtual machines;
the system configured to:
receiving, at a first SmartNIC from a node outside of the virtualized computing environment, a data packet addressed to an endpoint hosted by one of the virtual machines in the virtual private network;
performing, by the first SmartNIC, network termination and authentication of the data packet to generate an input data packet, wherein the first SmartNIC comprises a hardware-based acceleration device configured to perform cryptographic and authentication processes of the network termination and authentication in the first SmartNIC using one or more of ASIC logic, ASIC processors, configurable FPGA logic, or FPGA software processor overlays;
sending, by the first SmartNIC, the input data packet to the cloud edge node;
applying, by the cloud edge node, security filtering on the input data packet;
identifying, by the cloud edge node based on the input data packet, a target resource within the virtualized computing environment for the input data packet;
forwarding, by the cloud edge node, the filtered input data packet to a second SmartNIC that is associated with the target resource of the virtualized computing environment;
based on a policy associated with the filtered input data packet, applying, by the second SmartNIC that is associated with the target resource, the policy to the filtered input data packet; and
securely transporting, based on the policy applied by the second SmartNIC that is associated with the target resource, the filtered input data packet to the endpoint hosted by the one virtual machine in the virtual private network;
wherein the first SmartNIC, cloud edge node, and second SmartNIC are physically distributed in the virtualized computing environment and configured as a logically pooled resource independent of the physical distribution, the logically pooled resource configured to provide disaggregated services for data flows associated with the plurality of computing nodes.

7. The system of claim 6, wherein the network termination and authentication of the data packet comprises Secure Sockets Layer (SSL), Transport Layer Security (TLS), or Internet Protocol Security (IPSec) termination.

8. The system of claim 6, wherein the security filtering comprises applying layer-7 inspection and distributed denial-of-service (DDoS) protection.

9. The system of claim 7, wherein the securely transporting is performed using logical tunnels.

10. The system of claim 6, wherein a plurality of the cloud edge processing functions are executed in a plurality of cloud edge nodes of the computing environment.

11. The system of claim 6, wherein a number of the computing nodes in the computing environment is determined based on power and bandwidth constraints.

12. A system comprising:
a plurality of computing nodes communicatively coupled to a plurality of SmartNICs configured to implement a software defined network (SDN) in a virtualized computing environment, wherein:
the computing nodes include a cloud edge node configured to provide at least one cloud edge processing function,
the SmartNICs are configured to enable communications between virtual machines within a virtual network of the virtualized computing environment in accordance with associated policies, and
the SmartNICs and the processing function are disaggregated from dependencies on particular computing nodes that are hosting the virtual machines;
the system configured to:
perform, by a first SmartNIC, network termination and authentication of a data packet addressed to an endpoint hosted by one of the virtual machines in a virtual network of the virtualized computing environment, the SmartNIC comprising a hardware-based acceleration device configured to perform cryptographic and authentication processes of the network termination and authentication using one or more of ASIC logic, ASIC processors, configurable FPGA logic, or FPGA software processor overlays;
send, by the first SmartNIC, the data packet to a cloud edge node configured to perform data packet routing;
process, by the cloud edge node, the data packet to determine a target resource of the virtualized computing environment that is associated with the data packet;
forward, by the cloud edge node, the data packet to a second SmartNIC that is associated with the target resource, the second SmartNIC identified based on the processing of the data packet;
apply, by the second SmartNIC associated with the target resource, a policy associated with the data packet to generate a processed data packet; and
securely transport, by the second SmartNIC associated with the target resource, to the one virtual machine in the virtual network based on the applied policy;
wherein the first SmartNIC, cloud edge node, and second SmartNIC are physically distributed in the virtualized computing environment and configured as a logically pooled resource independent of the physical distribution, the logically pooled resource configured to provide disaggregated services for data flows associated with the plurality of computing nodes.

13. The system of claim 12, wherein a plurality of the cloud edge processing functions is executed in a plurality of computing nodes of the virtualized computing environment.

14. The system of claim 13, wherein the network termination and authentication of the data packet comprises Secure Sockets Layer (SSL), Transport Layer Security (TLS), or Internet Protocol Security (IPSec) termination.

15. The system of claim 12, wherein the processing the data packet comprises applying layer-7 inspection and distributed denial-of-service (DDoS) protection.

16. The system of claim 13, wherein the securely transporting is performed using logical tunnels.

* * * * *